United States Patent
Balasubramanian et al.

(10) Patent No.: US 9,619,222 B2
(45) Date of Patent: Apr. 11, 2017

(54) SYSTEM, METHOD AND APPARATUS FOR AUTOMATIC DEVICE REGISTRATION AND SECURE APPLICATION ACTIVATION

(71) Applicant: International Business Machines Corporation, Armonk, NY (US)

(72) Inventors: Rajesh Balasubramanian, Cedar Creek, TX (US); Joseph W. Ligman, Wilton, CT (US); Marco Pistoia, Amawalk, NY (US); John Ponzo, Yorktown Heights, NY (US); Gregory L. Truty, Austin, TX (US); Stephen P. Wood, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/156,643

(22) Filed: Jan. 16, 2014

(65) Prior Publication Data
US 2015/0199193 A1      Jul. 16, 2015

(51) Int. Cl.
*G06F 9/44*       (2006.01)
*G06F 9/445*      (2006.01)
*G06F 21/62*      (2013.01)

(52) U.S. Cl.
CPC .............. *G06F 8/65* (2013.01); *G06F 8/665* (2013.01); *G06F 21/629* (2013.01); *G06F 2221/2111* (2013.01); *G06F 2221/2115* (2013.01); *G06F 2221/2137* (2013.01)

(58) Field of Classification Search
CPC ...... H04L 63/08; H04L 63/102–63/105; G06F 8/61; G06F 8/65

USPC ........................................ 717/168–178; 726/4
See application file for complete search history.

(56) References Cited

U.S. PATENT DOCUMENTS

| | | | | |
|---|---|---|---|---|
| 7,069,539 B1 * | 6/2006 | Roberts | .................... | 717/110 |
| 7,818,788 B2 * | 10/2010 | Meier | .................. | G06F 21/577 |
| | | | | 726/18 |
| 8,181,219 B2 | 5/2012 | Golan et al. | | |
| 8,347,278 B2 * | 1/2013 | Kettley | ............... | G06F 11/3644 |
| | | | | 717/140 |
| 8,532,640 B2 | 9/2013 | Bussey et al. | | |
| 8,595,810 B1 * | 11/2013 | Ben Ayed | ........... | H04L 63/0815 |
| | | | | 713/168 |

(Continued)

*Primary Examiner* — Francisco Aponte
(74) *Attorney, Agent, or Firm* — Harrington & Smith (57) ABSTRACT

A method modifies an application program to create an augmented application program by including at least one call and a software library in the application program. The at least one call is to a method that forms part of the library. The method further includes, upon receiving a request from an augmented application program resident on the device, registering and authenticating the augmented application program and sending a policy file to the device that is configured to control use of only the augmented application program. Another method receives at a device an application program augmented to include the at least one call and software library. The method further includes launching the application program and sending a registration and authentication request to a server of an enterprise, and receiving from the server a policy file configured for controlling use by the device of only the registered and authenticated augmented application program.

18 Claims, 5 Drawing Sheets

(56) References Cited

U.S. PATENT DOCUMENTS

| | | | |
|---|---|---|---|
| 8,695,060 B2 * | 4/2014 | Wade | G06F 21/54 726/1 |
| 8,719,586 B1 * | 5/2014 | Paleja | G06F 17/30 705/57 |
| 8,769,063 B2 * | 7/2014 | Barton | H04L 41/00 709/220 |
| 9,218,464 B2 * | 12/2015 | Wicker | G06F 21/10 |
| 2003/0135638 A1 * | 7/2003 | Brabson et al. | 709/232 |
| 2005/0153682 A1 | 7/2005 | Minear et al. | |
| 2009/0037329 A1 | 2/2009 | Coppinger | |
| 2009/0187980 A1 | 7/2009 | Tung | |
| 2010/0131386 A1 | 5/2010 | Shiely et al. | |
| 2010/0175104 A1 * | 7/2010 | Khalid | G06F 9/545 726/1 |
| 2011/0055912 A1 * | 3/2011 | Fusari et al. | 726/8 |
| 2011/0154447 A1 | 6/2011 | Dennis et al. | |
| 2011/0167105 A1 * | 7/2011 | Ramakrishnan et al. | 709/203 |
| 2011/0252415 A1 | 10/2011 | Ricci | |
| 2011/0302622 A1 | 12/2011 | Bregman et al. | |
| 2012/0210443 A1 * | 8/2012 | Blaisdell | G06F 21/12 726/27 |
| 2012/0222129 A1 | 8/2012 | Raciopi et al. | |
| 2013/0091543 A1 * | 4/2013 | Wade | G06F 21/54 726/1 |
| 2013/0117805 A1 | 5/2013 | Kent et al. | |
| 2013/0124673 A1 | 5/2013 | Hjelm et al. | |
| 2014/0006347 A1 * | 1/2014 | Qureshi | G06F 21/10 707/621 |
| 2014/0006772 A1 * | 1/2014 | Qureshi | G06F 21/10 713/150 |
| 2014/0007048 A1 * | 1/2014 | Qureshi | G06F 21/10 717/110 |
| 2014/0007182 A1 * | 1/2014 | Qureshi | G06F 21/10 726/1 |
| 2014/0007183 A1 * | 1/2014 | Qureshi | G06F 21/10 726/1 |
| 2014/0007192 A1 * | 1/2014 | Qureshi | G06F 21/10 726/3 |
| 2014/0007193 A1 * | 1/2014 | Qureshi | G06F 21/10 726/3 |
| 2014/0007222 A1 * | 1/2014 | Qureshi | G06F 21/10 726/16 |
| 2014/0032691 A1 * | 1/2014 | Barton | H04L 41/00 709/206 |
| 2014/0032733 A1 * | 1/2014 | Barton | H04L 41/00 709/223 |
| 2014/0040622 A1 * | 2/2014 | Kendall et al. | 713/171 |
| 2014/0040638 A1 * | 2/2014 | Barton | H04L 41/00 713/193 |
| 2014/0181896 A1 * | 6/2014 | Yablokov | H04L 63/10 726/1 |

* cited by examiner

SYSTEM, METHOD AND APPARATUS FOR AUTOMATIC DEVICE REGISTRATION AND SECURE APPLICATION ACTIVATION

TECHNICAL FIELD

The exemplary embodiments of this invention relate generally to provisioning devices, such as mobile computing and/or mobile communication devices, with application software.

BACKGROUND

A user's device can be any type of computing and/or communications device such as, but not limited to, a cell phone (e.g., a smartphone), a tablet computer and a laptop computer. In some circumstances a user is enabled or encouraged to bring the user's device into the user's work place environment and to use the device in the work place. This situation can be referred to as BYOD (Bring Your Own Device). Of course this scenario does not necessarily mean that the user be physically present in the work place when using the device since one may be able to connect such devices into the work place environment from a remote location such as from the user's home or from a customer location.

Two somewhat related problem areas can arise in the domain of enterprise management of user devices, in particular BYOD type devices, and applications running on them. A first problem area relates to the fact that existing MDM (Mobile Device Management) solutions either require the user to submit their entire device to the enterprise management system to be configured with an enterprise application, or the user's device is configured to run a so-called hybrid application that runs in a specialized container for each user device platform.

The former solution is typically at odds with the desires of the user as the enterprise assumes complete control over the user's personal device and has the ability to perform deep system level operations, such as erasing all data from the device. This approach can thereby endanger any personal data that the user has stored on the device. This loss of control over the user's device, and the potential loss of data and confidentiality, would generally be objectionable to many users.

The latter solution, being hybrid, mainly uses web technologies in a custom platform container. With the web container the applications must be developed specifically for the applicable container rather than the device. The container normally abstracts device/operating system (OS) differences away, to the best of its ability, so that the application can be developed once but run 'anywhere'. The container would offer the ability to build the application from web components (e.g., html plus javascript, etc.) to provide portability to the application code, but at the expense of the application not being a native application. The developer of the container needs to ensure that the container can work in multiple devices/OSs (generally platforms) while presenting a common interface. Such a hybrid application is not a native application and can lack the performance and the user interface (UI) look and behavior of a similar native application.

Enterprises generally desire to exert fine grain control of enterprise applications, such as controlling which users can run the application and/or what devices can be used with the application. Also the enterprise needs to be able to control the application should its install package be handed off to someone else, or in the event that the user no longer has a relationship with the enterprise (e.g., the user terminates his employment with the enterprise). In the latter case an enterprise that provides a "store" of applications, that it has developed for a certain family of user devices, can be legally obligated by its use of the specific device platform to ensure that such applications are limited only to enterprise use.

SUMMARY

In a first aspect thereof the embodiments of this invention provide a method that is performed at least in part by at least one data processor. The method comprises modifying an application program to create an augmented application program, where modifying comprises including at least one call and a software library in the application program, and where the at least one call is to a method that comprises part of the software library. The method further comprises, upon receiving a request from an augmented application program via a device where the augmented application program is resident, a step of registering and authenticating the augmented application program based at least in part upon information received with the request. The method further comprises sending a policy file to the augmented application program, where the policy file is configured for controlling use of only the registered and authenticated augmented application program.

In another aspect thereof the various examples of the embodiments of this invention provide a system comprised of at least one data processor connected with at least one memory that stores software instructions. Execution of the software instructions by the at least one data processor causes the system to modify an application program to create an augmented application program, where modifying comprises including at least one call and a software library in the application program, where the at least one call is to a method that comprises part of the software library. In response to a receipt of a request from the augmented application program via a device where the augmented application program is resident, the system further operates to register and authenticate the augmented application program based at least in part upon information received with the request. The system further operates to send a policy file to the augmented application program via the device, where the policy file is configured for controlling use of only the registered and authenticated augmented application program.

In yet another aspect thereof the various examples of the embodiments of this invention provide a computer program product comprised of software instructions on a computer-readable medium. Execution of the software instructions using a computer results in performing operations that comprise modifying an application program to create an augmented application program, where modifying comprises including at least one call and a software library in the application program, and where the at least one call is to a method that comprises part of the software library. Upon receiving a request from the augmented application program via a device where the augmented application program is resident, a further operation involves registering and authenticating the augmented application program based at least in part upon information received with the request. Another operation involves sending a policy file to the augmented application program via the device, where the policy file is configured for controlling use of only the registered and authenticated augmented application program.

In accordance with yet another aspect thereof the embodiments of this invention provide a method that comprises receiving an application program at a device, where the application program is augmented to include at least one call and a software library. The at least one call is to a method that comprises part of the software library. The method further includes launching the application program and sending a request to a server of an enterprise, where the request is one to register and authenticate the augmented application program. The request is sent with information descriptive of at least the device and a user of the device. The method further includes receiving a policy file from the server, where the policy file is configured for controlling use of only the registered and authenticated augmented application program. The method further includes running the augmented application program in the device in cooperation with calls made to the software library and in cooperation with the policy file.

DETAILED DESCRIPTION

The ensuing description is made at least partially in the context of "organizations", "enterprises" and "employees". As discussed herein an "organization" can be generally considered to be an organized body of people with a particular purpose including, for example, a business, a society, an administration, or an association. Examples of an organization include a company, a firm, a corporation, an institution, a group, an agency, or a consortium. An "enterprise" can be generally considered herein to be any type of organization including, as non-limiting examples, a for-profit organization, a not-for-profit organization including charities and educational institutions, or a governmental agency. A user of a device and an end-user of an application run on the device can be an "employee" of an enterprise. An "employee" can be generally considered herein to be any person who can be affiliated in some manner with an organization or an enterprise such as a salaried employee, a non-salaried employee, an external contractor for hire or even a volunteer.

An application can be any software program capable of being run on a user's device, typically under the control of an operating system of the user's device. For the purpose of describing this invention an application is a software program written for or by an enterprise for use at least by employees of the enterprise. An application program when run can impart any desired functionality to the user's device. Non-limiting examples of application programs are those that provide access to enterprise data and databases. Several non-limiting examples of enterprise data can include sales data, inventory data, shipping data, management data, regulatory data, financial data, human resources (HR) data, customer lists, membership lists and donor lists. It can be understood that an enterprise associated with this type of data has an interest in controlling to where application programs that provide access to this data are deployed, as well as having an interest in controlling the use, conditions for use and a lifecycle of such application programs.

The embodiments of this invention provide a means whereby a software application, which can be a native application or a hybrid application, whether from a third party developer or developed in house by an enterprise, can be augmented as part of a process of deployment into the enterprise with functionality to perform both device registration and application activation at the granularity of each application and each end-user. One advantage of the use of the embodiments of this invention is that it solves the problematic aspects of at least those conventional BYOD approaches discussed previously.

As an overview of the embodiments of this invention, as part of an acceptance process whereby an application is determined to be suitable for use in an enterprise an application manager responsible for the acceptance process automatically augments the application with functionality to perform application activation and device registration. The now enterprise-ready augmented version of the application (an augmented application program) can be deployed from, for example, an enterprise application store for employees of the enterprise to download the application and install on their respective own devices.

It is pointed out that while the embodiments of this invention are primarily described in the context of BYOD, the embodiments are applicable as well in a case where the user devices are enterprise owned/supplied devices that are provided to employees of the enterprise.

After an end-user visits the store, downloads and then installs the augmented application program on the user's device the augmented application program can prompt the user to authenticate and activate the application with a backend server. The authentication can involve the use of recognized personal credentials unique to that user. The activation logic is injected into the application as part of the acceptance and deployment process and conforms to the requirements of the enterprise. This application logic can operate with or be comprised of an initially provided policy file that is provisioned to the augmented application program prior to it being downloaded. The application authentication and activation can be accomplished without the need of an application developer having to explicitly include such logic when the application is developed. One advantage of this approach is that third party applications, i.e., those developed outside of the enterprise, can be brought into the enterprise and secured for enterprise use.

Note that the embodiments of this invention do not preclude this activation logic from being 'manually' included by the developer in the application prior to delivery to the enterprise, such as by the use of a software development kit (SDK) that is available to the developer. However adding the activation logic automatically by the enterprise, as opposed to manually by the application developer, as part of the deployment process allows the activation logic to change and be updated independent of the development lifecycle of the application. Furthermore, manually adding the activation logic can be more error prone that automatically adding it. However, some enterprises, e.g., financial institutions, could be more receptive to such a mechanism whereby they fully understand what the augmentation is for the application and that it poses no security or privacy problems.

It should be noted that in some embodiments of this invention a particular application program could be augmented by the application program developer prior to delivery to the enterprise so as to include logic that comprises a basic and simple policy file that only initiates and controls the registration and authentication of the application program with the enterprise. Thereafter the enterprise can provide another (updated) policy file or policy files that actually control various aspects of the application program operation during the lifecycle of the application program once the application program is registered and provisioned to employees of the enterprise. As will be made apparent below, each such policy file or updated policy file can be applicable to all instances of a certain application program that is provisioned to user's devices, or to just certain subsets of instances of the application program provisioned to the user's devices (e.g., a policy file governing use of the application in a first country may differ from a version of the policy file governing use of the application in a second country), or each policy file or updated policy file can be applicable to only one or but a few instances of a certain provisioned application program. This approach provides the enterprise with a scale of granularity from coarse to fine as to the use of application programs that are provisioned to the employee's user devices.

In general, the original activation code/policy file may be the only one required by the application program during the lifecycle of the application program, or it can be subsequently revised/updated by the enterprise to accommodate any number of possibly evolving dynamic conditions, including for example changes in regulatory rules, changes in enterprise policy, changes in the user's job description/responsibilities, etc.

When the augmented application program starts, if it has not already registered the augmentation code realizes this based on an initial policy file/activation program code and prompts the user to register. The registration is performed with some remote management system (e.g., with a back-end server of the enterprise). The initial policy file includes at least one or more activation 'rules'. One such rule may be simply 'always activate' or it may contain temporal and/or geo-coordinate based activation constraints/rules. As such, a request to register does not come from the device per se but rather at startup from the downloaded application code augmented with the logic provided by the enterprise or by the application code developer. The augmented application program communicates directly with the remote server(s)/entities(s) for registration/authentication prior to possibly receiving an updated policy file. No device or platform modifications are required to be made, instead the augmentation code added to each application is responsible for ensuring that the application program is registered. While a communication to the remote server/system is made via the device and the device OS, the registration and policy file communications can be considered as taking place directly between the remote server/system(s) and the augmented application program.

Upon the end-user supplying their credentials the credentials are verified by the back end server and the device upon which the end-user has installed the application is registered against the end-user, if it has not been seen before. The device may be checked against lists maintained by the server if the enterprise has a requirement to limit device types/versions, etc. Such lists can also be maintained for end-users, and/or groups of end-users, if restricted usage of the application is desired in order to deny activation to users not meeting some particular enterprise membership, job function, security level, or other such criteria.

Once the device and user have passed the checks by the server then a policy file (an updated or new policy file) may be passed back to the application. A policy file in various aspects thereof can declaratively define the application's authentication lifecycle, such as how long the application is valid, and/or at what location(s) the application is allowed to execute (geo-fencing), and/or how often the user is required to re-authenticate with the back end server in order to continue using the application program. The declarative policy file can be created by the application manager prior to and/or during the deployment phase. The use of the declarative policy file that is downloaded to the user's device allows authentication criteria to be altered during the life cycle of the application as the enterprise sees fit, without requiring that the authentication criteria be 'hard-coded' in the application. This can avoid the need for the user to repetitively install updated versions of the application. For example, one policy could state that the application needs to be re-authenticated once per week and furthermore is only permitted to operate within some defined geographical boundaries that encompass the location of the enterprise office or campus. This latter mode of operation can assume that the location of the user's device is capable of being determined, such as by the use of GPS-derived coordinates or other location positioning techniques (e.g., triangulation). Policy files also allow different users/groups to have different behavior for the same installed application, and can also be changed if the user's employment responsibilities change. A policy file associated with a particular application can also be updated as needed and re-deployed to a pool of user devices via push and/or polling delivery.

As was noted above an initial policy file is sent to the application as part of the augmented application program and/or as part of the registration process. Thereafter the policy file can be updated as needed, but in all cases it is sent directly to the application. An updated or new policy file can, for example, be requested by the application via periodic polling, or after expiration of the policy file, or in response to being informed that an updated policy file is needed, or at the digression of the enterprise at any time.

Part of the augmentation that is made to the application code inspects and acts upon the policy file. The policy file is stored by the application and can be considered as application specific data. There need be no central policy store on the user's device. If a particular application program is uninstalled from the user's device then the application data, including the application policy file, would typically be removed by the platform too as part of the un-installation process for that particular application. This is true even in the case where the same or basically the same policy file can be used by two or more application programs. That is, preferably a given policy file is associated with one instance of a given application program.

The policy file is directly sent to (received by) the application program that includes the augmentation code. The policy file can be tailored to each specific instance of the installed application if desired; e.g., the policy can be tailored by device type and/or by end user (once this information is ascertained as part of the registration process) and can be customized for each application based on the functions of the application program. The policy file can be selected and/or built/customized once the backend server understands the application, who the user is, as well as the specifics of the device and device platform that the application program will be run on.

The embodiments of this invention provide an ability to augment an application program in a 'transparent' manner without the involvement of the original application developer. As such any application, including various social networking and other types of applications, that an enterprise deems useful can be managed. The managed application program does not need to have been explicitly written for or by the enterprise and could be obtained from an unrelated third party developer or even from another enterprise (e.g., from a social networking enterprise).

Note again that the communications with the augmented application program are direct. While the communications go via the device platform/OS to and from the application and the remote server(s), the request for registration per se is not originated by the user's device, but instead by the augmented application program resident in the device in coordination with the associated policy file.

Figure 1:
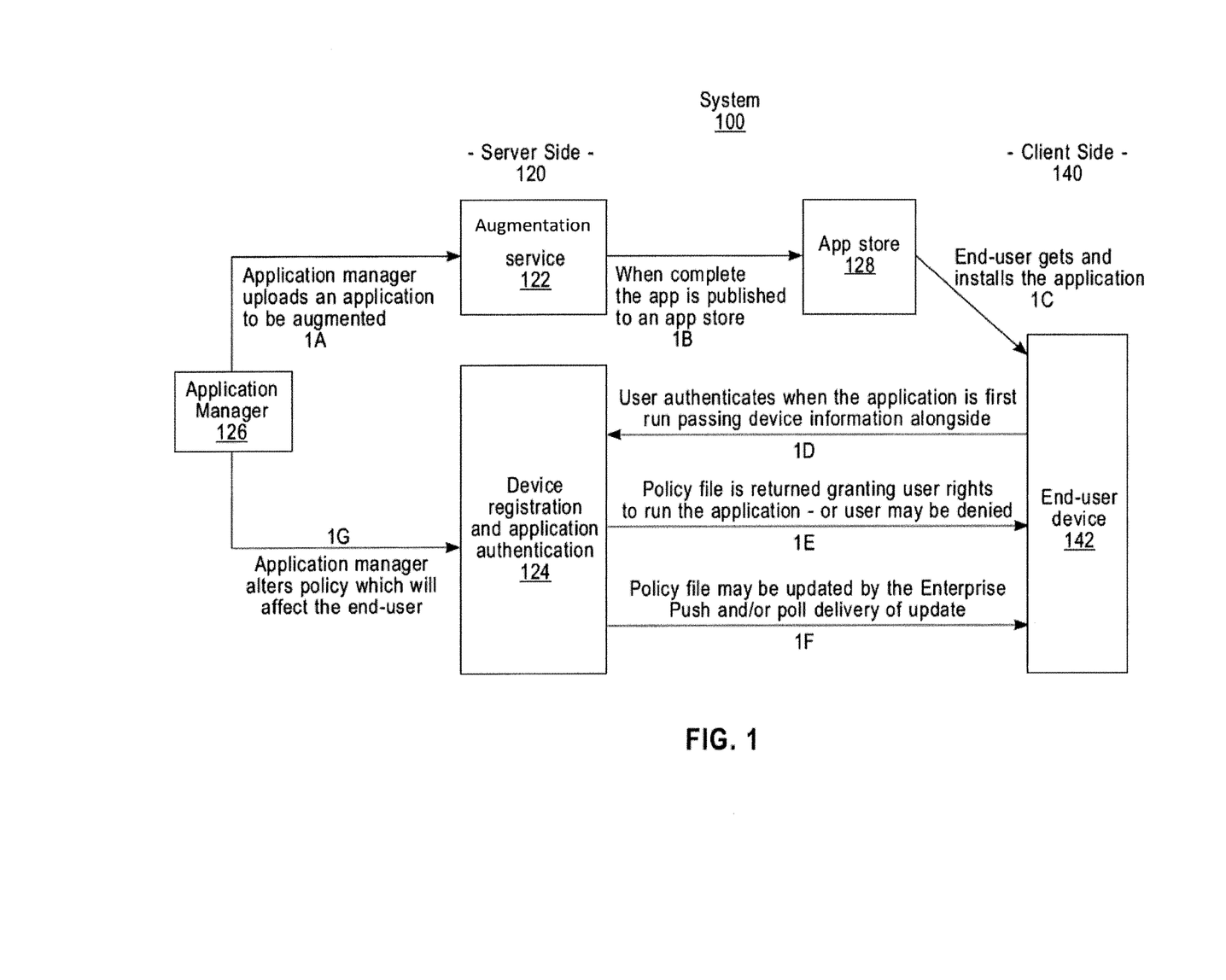
FIG. 1 is a block diagram illustrating device registration and application authentication components and message/data flow in accordance with embodiments of this invention.

Describing the embodiments of this invention now in further detail, reference is made to FIG. 1 for showing a system 100 having a server side 120 and a client side 140. The server side 120 can be implemented with one or more enterprise data processing systems/servers while the client side 140 can be implemented with an end user's device, e.g., a user's tablet computer or smartphone.

On the server side 120 is an augmentation service block 122, a device registration and application authentication block 124 and an application manager 126. Interposed between the server side 120 and the client side 140, and typically associated with the server side 120, is a repository of applications. The repository of applications can be referred to as an application (app) store 128 from where an end user device 142 can download an application prior to authentication and activation of the application. The app store 128 functions as a portal for the user device 142 to augmented applications resident in the app store, and the user need have no knowledge or awareness of the other server side components.

At 1A the augmentation service block 122 receives an application to be augmented from the application manager 126. The application can be a third party application or an application developed by the enterprise itself. After augmentation the augmented application is published (1B) to the app store 128 from where it is downloaded at 1C to the end user device 142 for installation, authentication and activation. The augmented application is authenticated at 1D when it is first run using an initial augmentation logic/policy file. This involves passing device/user information to the device registration and application authentication block 124. The device registration and application authentication block 124 may receive at 1E a policy or an altered policy for the application from the application manager 126. At 1F a revised or altered or modified or replacement policy file can be returned to the end user device 142 granting the user device 142 rights to run the application (or the user device 142 can be denied permission to run the application), as well as to generally control use of the application program within the enterprise. At 1G the policy file can be replaced and/or updated, or withdrawn, during the lifetime of the application subscription.

As was noted previously the authentication of the application program and/or user and/or user device may be required periodically and thus can occur more than just when the application program is first run. If the policy file for the application program is unchanged for a particular repeat occurrence of an authentication there would be no need to send the policy file 160 back to the application program. However, this could be done simply to maintain consistency in the message passing procedures. Further, if each instance of the policy file is time stamped in some manner when it is sent to the application program then always sending the policy file can be useful for determining, such as by querying the application program, that a particular user device and associated application program have a most recent version of the instance of the policy file that is applicable to the application program.

The augmentation service 122 functions to analyze the uploaded application and augment it, if not already done by the application program developer, with policy controlled activation code. The device registration and application authentication block 124 functions to handle the subsequent registration and user authentication aspects to enable the application to be run by the end user device 142. These components 122, 124 may form part of a single back-end server system. One or both of the components 122, 124 could be integrated with each other and/or with the application manager 126, or they can be deployed separately as shown.

Figure 2:
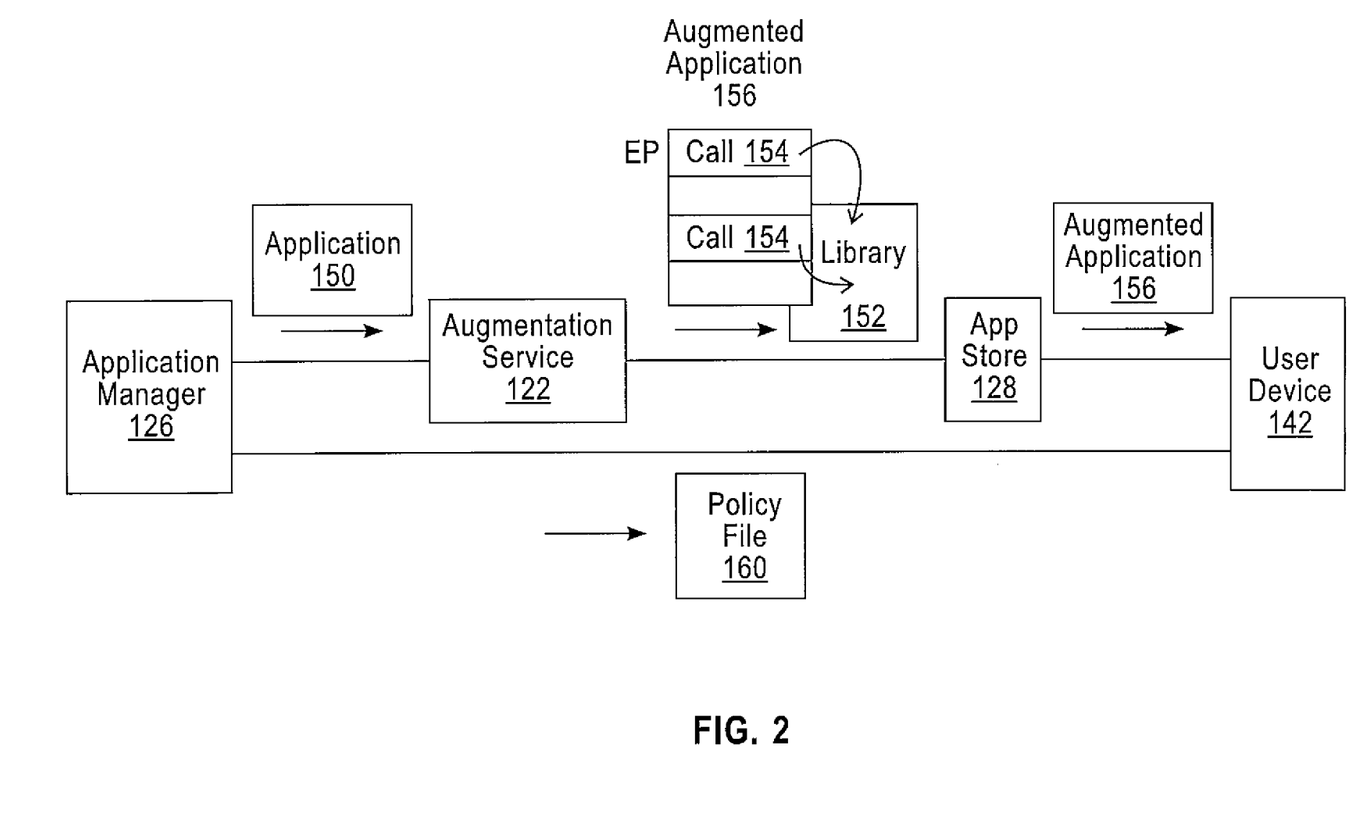
FIG. 2 is descriptive of the operations of an application manager during a process of augmenting an application with calls to a device registration and authentication software library and providing a user device with the augmented application and a policy file that controls the operation of the augmented application.

In operation, and also referring to FIG. 2, the application manager 126 uploads to the augmentation service 122 an application 150 that is to be made enterprise ready. The specifics of the device platform (e.g. operating system) that the application 150 will eventually run on is determined since the augmentation logic to be added to the application can vary by platform, platform version, etc.

Once the platform/version is determined the application 150 is augmented with a device registration and authentication software library 152 and calls 154 to the library 152 are weaved (injected) into the existing code of the application 150 to provide an augmented application 156. The weaving process can involve adding the library calls 154 in the application code where there were none before. This process can differ as to whether the application 150 was originally supplied in source or binary form, and what programming language(s) were used to build the application 150. This process can include known techniques such as byte code injection, application program interface (API) method swizzling, or otherwise modifying the binary and/or source code at one or more key points to alter the original flows of the application 150 with the injected library calls 154. API method swizzling is a known procedure that can be used with Objective-C to exchange the implementation of two methods, i.e., the implementation of one method can be exchanged with an implementation of another method.

One such key point in the application 150 is the entry point (EP). In this case the entry point can be altered to inject code to cause a call to the device registration and authentication software library 152 in order to display UI components as needed to gather the user's credentials and to provide logic to securely send to the back end server the user's credentials along with ancillary information about the user's device 142 such as its type, version, geographic location, and other information. What is required to be sent back, and to what server, can be initially determined by a simple initial policy file that is supplied as part of the augmentation.

Additional checks for re-authentication or to whether the application should be allowed to continue can be injected at other key points in the application 150, such as at a periodically occurring event and/or at events where the application 150 is awakened from an inactive state to allow checking the application/device with the backend server at times other than start-up. A periodic check can be introduced into the application 150 if no suitable key point exists in the application 150.

After the original logic of the application 150 has been altered to include the necessary calls 154 to the device registration and authentication software library 152 (i.e., the application 150 is provided at least with an initial policy file) the application is re-packaged as the augmented application 156 and is ready to be deployed to the application store 128, or to any other means of access by the end-user device 142 such that the augmented application 156 can be installed.

The end-user visits the application store 128, downloads the augmented application 156 (operation 1C in FIG. 1) or the augmented application 156 can be acquired by other means (e.g., it could be supplied on a data carrier), and the augmented application 156 is installed on the users' device 142. When the user launches the augmented application program 156 for the first time it presents the user with an appropriate mechanism/UI to obtain the user's credentials (credentials recognized in the enterprise such as an employee number, employee password, etc.). This activity is initiated by the activation logic in cooperation with the initially provided policy file that was provisioned to the application program automatically by the enterprise applications service 122 and/or by the application program developer. This mechanism/UI can be as simple as a dialog box with edit fields for entering the user id and password. After the user has entered their credentials they are sent off to the back-end server that contains the device registration and application authentication system 124. The credentials can be sent with information descriptive of the device 142 such as the manufacturer of the device, the device version, the OS platform and version, etc.

At the server the user's credentials are checked and the device 142 is registered with the system against the user, if the device has not been seen before. The device 142 is checked against any existing valid/invalid lists of devices and the user is checked to see if the user has the necessary permissions to actually run the application. A particular user may belong to a group or groups, can have a defined job role, etc., in the organization and the application 156 can be setup to allow or ban its use at any particular level or in any particular context. If the credentials are deemed to be valid the device 142 is acceptable and the user is given the necessary permissions to run the application.

At this point a policy file 160 defining the authentication lifecycle of the application 156 can be selected for the user and returned to the application 156 (operation 1E in FIG. 1). A particular policy file 160 may apply to every user using the application 156 and/or application program instance, or it can be defined for a specific user, by group membership and/or job role, etc., to provide control over the use of the application 156 at whatever level of control and granularity deemed necessary by the enterprise.

When the augmented application 156 receives the policy file 160, whether initially as part of the application program download or subsequently after registration of the application, the authentication logic embedded in the device registration and authentication software library 152 parses the policy file 160 and acts on it. The policy file 160 can include temporal aspects, for example the user must re-authenticate the application 156 periodically in order for it to continue to run. The policy file 160 can also include time periods and/or geographic locations at which the augmented application 156 will or will not be allowed to operate. As non-limiting examples, the application 156 may only be authorized to run during the employee user's normal working hours and/or may only be authorized to run when the device 142 is located in the office or on the campus of the enterprise. In general, in some embodiments of this invention a given policy file 160 can be considered to specify at least one of a temporal constraint and a spatial constraint on the use of the augmented application program at the user device 142. However, in other embodiments a simple policy file 160 can be used that just activates the application program without imposing any dynamic temporal or spatial constraints on or after the activation. Even in this case though there may be a requirement imposed by the simple policy file 160 to periodically re-activate the application program 156 to at least ensure that there is a valid user running the application.

The application manager 126 can also update the policy file 160 and/or create a new policy file for specific users, or groups of users. etc., after the application 156 has been deployed. New or updated policy files can be delivered to the application 156 by push the policy file to the user's device 142 or through the use of polling techniques (operation 1F in FIG. 1).

The augmented application 156 can be instructed to terminate operation immediately by receipt of a policy file 160 to that effect. Such a 'termination' policy file 160 for example could be created specifically for a certain user when the user is no longer an employee of the enterprise. The termination policy file can then be pushed to the user's device 142 and/or a periodic library call to the device registration and authentication software library 152 can be used to poll the backend server to verify that the application 156 is still authorized to execute.

As can be appreciated by the foregoing discussion aspects of this invention involve at least the following operations. A policy file 160 (policy) is sent to a client mobile application 156 that is downloaded to the user device 142 to interpret/enforce. The specific policy is matched to the application/user/device. The policy file 160 controls whether the application 156 will be allowed to operate. For fixed behaviors, e.g., the application 156 can be de-activated. For dynamic behaviors the application 156 can deactivate itself and prevent use unless within defined temporal and/or geographic and/or engaged in enterprise permitted uses. The access to the logic represented by the policy file 160 can be injected into an existing application. The management of application activation via the policy file 160 can be made independent of the application store 128 or the manner in which the application is obtained or licensed.

User authentication against a user directory service is performed to identify the user of the application 156 to determine an appropriate management policy for the application. The specifics of the actual user authentication can take any number of forms.

The ongoing eligibility of the end-user device 142 to use the application 156, which can change over time and/or location and/or the user's relationship to the enterprise, can be modified during the lifetime of the application 156 and can be enforced by the use of the policy file 160.

In accordance with the embodiments of this invention the augmented application 156 manages its own operations, and the ability to operate in the context of the enterprise, via the policy file 160.

Each augmented application 156 that is hosted by the user device 142 is self-contained and is individually managed, i.e., no central repository or engine of globally applied policies running on the device 142 is needed, thereby providing individual application management for a BYOD where an employee may have personal applications as well as one or more enterprise applications installed. The enterprise applications can be managed independently of any personal applications that the user may have installed on the device 142.

Each augmented application 156 has its own associated injected management code that individually enforces the requirements of the associated policy file 160 in cooperation with the authentication software library 152.

In accordance with the embodiments of this invention a single policy file 160 specific to one instance of an augmented application 156 can be provided, wherein logic added to the augmented application 156 interprets and acts on its specific associated policy file 160. Each application 156 can have an associated dedicated policy file 160, and in some embodiments each deployed instance of a particular application 156 can have an associated dedicated policy file 160 that is selected/tailored for that instance of the application program. However, in some embodiments of this invention the same policy file 160 could be issued to more than one application 156. However in this case multiple policy files 160, even if the identical or substantially identical, are treated as separate instances on the user device 142 and each is specifically bound to the target application 156 that it applies to. That is, there need be no central repository containing one policy file that controls the operations of multiple applications on the user device 142.

In accordance with an aspect of this invention the policy file 160 is interpreted, acted upon and enforced by the augmentation code of the application 156.

Figure 3:
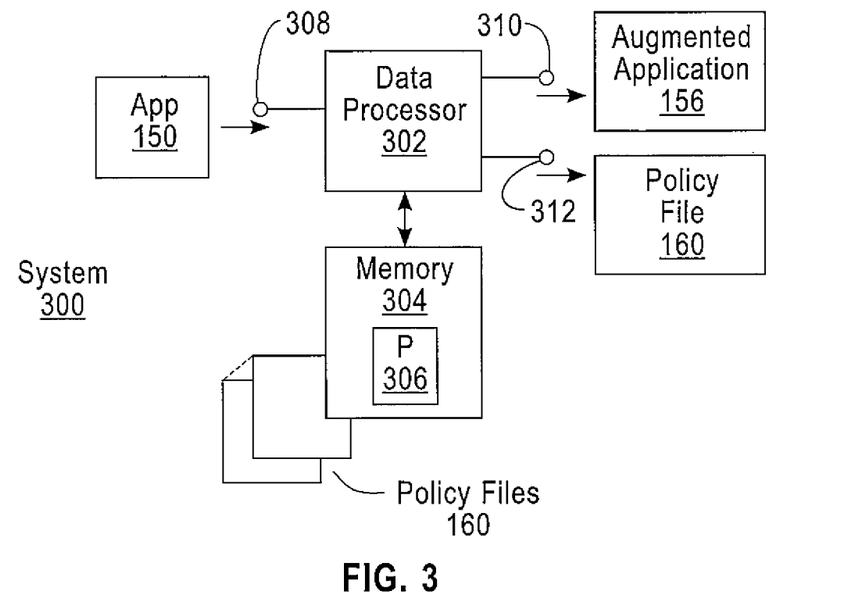
FIG. 3 shows an example of a data processing system that can be used to embody one or more of the components of the server side shown in FIG. 1.

FIG. 3 shows an example of a data processing system 300 that can be used to embody one or more of the components of the server side 120 shown in FIG. 1. For example, the data processing system 300 includes at least one data processor 302 connected with at least one computer-readable medium such as a memory 304 that stores a program 306 configured to perform the augmentation of a received application program 150 and communicate a policy file 160 as described above. The memory 304 is also configured to store one or more of the policy files 160 as well as user credentials and other information needed to authorize and authenticate a user of a device 142. The communication of a policy file 160 to the device 142 can be closely associated to the registration process in order to determine which policy file should be communicated based on the information received during the registration process. When the application program is augmented such policies can be created at that time for later deployment. The data processing system 300 further includes a first interface 308 configured to receive an application program 150 from some application source (e.g., a third party application developer or an internal, enterprise-associated application developer), a second interface 310 configured to output an augmented application program 156 to the app store 128 (which can form a part of the data processing system 300) as well as a third interface 312 configured to communicate with the user device 142 to authenticate and register the user device 142 and to send an applicable policy file 160 to the user device as described above. The interfaces 310, 312 and 314 can each be directly or indirectly connected to an associated network that can be embodied as a wired network or as a wireless network (e.g., a WiFi network, a WLAN network or a cellular network). In some embodiments two or more of the interfaces 310, 312 and 314 can be implemented using a single interface and network, such as through the use of an internet connection. In some embodiments the data processing system 300 can be physically located and instantiated at the enterprise, while in some other embodiments some or all of the data processing system 300 can be a virtual system hosted in the cloud either by the enterprise itself or by a third party cloud provider.

Figure 4:
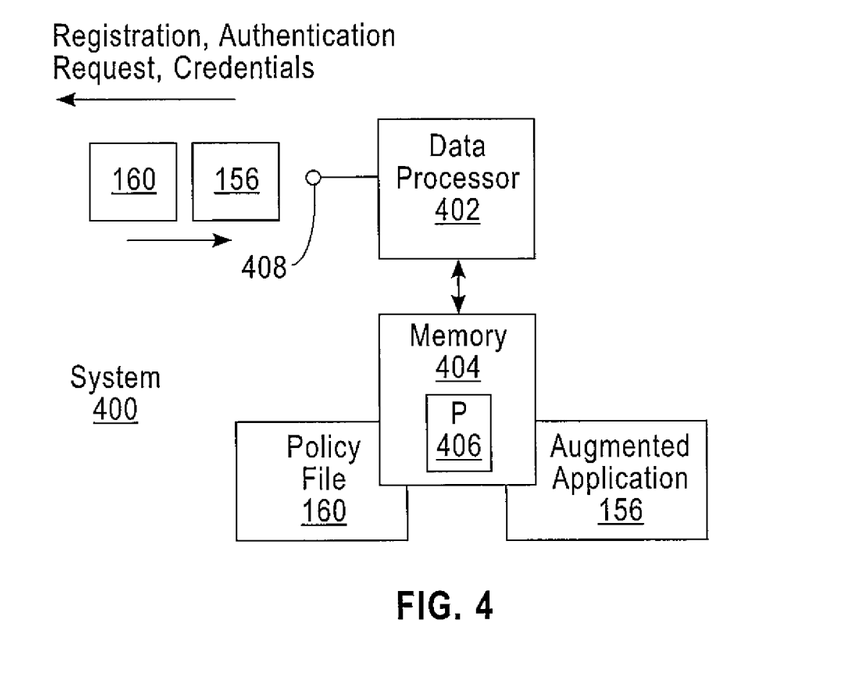
FIG. 4 shows an example of a data processing system that can be used to embody the user device shown in FIG. 1.

FIG. 4 shows an example of a data processing system 400 that can be used to embody the user device 142 shown in FIG. 1. In this case the data processing system 400 can include at least one data processor 402 connected with at least one computer-readable medium such as a memory 404 that stores a device operating system and a program 406 configured to receive an augmented application program 156, such as from the app store 128, as well as an associated policy file 160, and to execute the augmented application 156 in accordance with the associated policy file 160. The augmented application 156 and the policy file 160 can both be stored in the memory 404. The data processing system 400 further includes at least a one interface 408 configured to receive the augmented application program 156 and the applicable policy file 160 that is associated with the application program 156. The interface 408 can be directly or indirectly connected to an associated network that can be embodied as a wired network or as a wireless network (e.g., a WiFi network, a WLAN network or a cellular network). The device 142 can also include one or more subsystems such as, as non-limiting examples, an imaging subsystem and/or a position determining subsystem (e.g., a GPS receiver). In this case the application 156 can be granted permission or denied permission to utilize one or more of the subsystems under control of the policy file 160.

Figure 5:
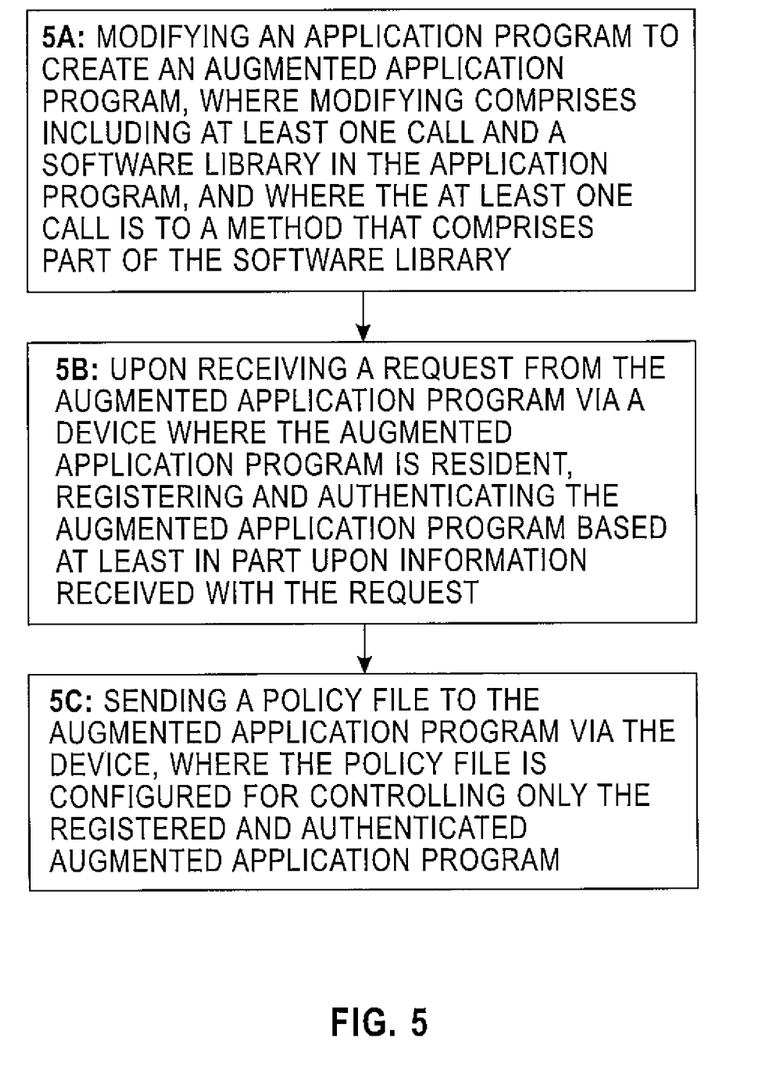
FIG. 5 is a logic flow diagram that illustrates a first method in accordance with the embodiments of this invention.

FIG. 5 is a logic flow diagram that illustrates a first method in accordance with the embodiments of this invention. The method includes at Block 5A modifying an application program to create an augmented application program, where modifying comprises including at least one call and a software library in the application program, where the at least one call is to a method that comprises part of the software library. The modification of the application program can be accomplished by the enterprise on an as received application program or the modification can be accomplished by an application program developer, e.g., a third party application developer, as part of the application program development process. At Block 5B there is a step performed, upon receiving a request from the augmented application program via a device where the augmented application program is resident, of registering and authenticating the augmented application program based at least in part upon information received with the request. At Block 5C there is a step of sending a policy file to the augmented application program via the device, where the policy file is configured for controlling use by the device of only the registered and authenticated augmented application.

Figure 6:
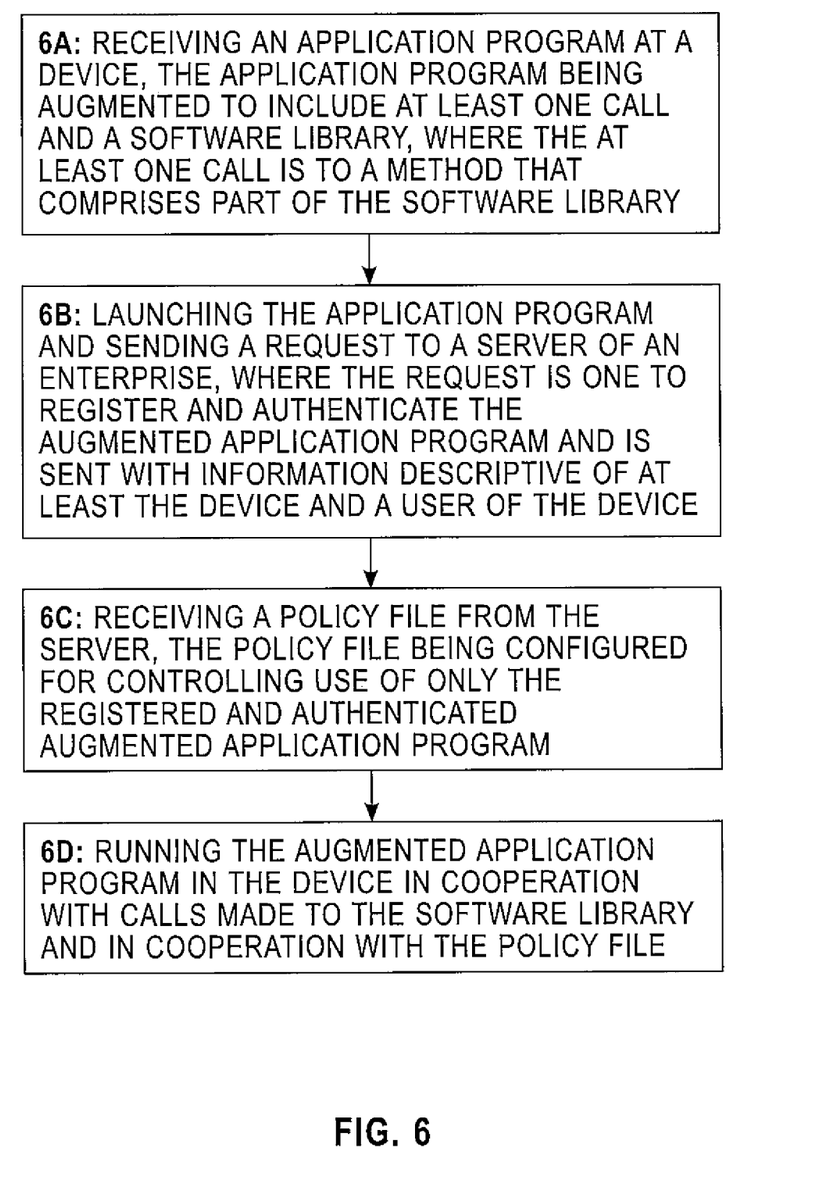
FIG. 6 is a logic flow diagram that illustrates another method in accordance with the embodiments of this invention.

FIG. 6 is a logic flow diagram that illustrates another method in accordance with the embodiments of this invention. At Block 6A there is a step of receiving an application program at a device, the application program being augmented to include at least one call and a software library. The at least one call is to a method that comprises part of the software library. At Block 6B there is a step of launching the application program and sending a request to a server of an enterprise. The request is one to register and authenticate the augmented application program. The request is sent with information descriptive of at least the device and a user of the device. At Block 6C there is a step of receiving a policy file from the server, the policy file being configured for controlling use of only the registered and authenticated augmented application program. At Block 6D there is a step of running the augmented application program in the device in cooperation with calls made to the software library and in cooperation with the policy file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method performed at least in part by at least one data processor, comprising:
   modifying an application program to create an augmented application program, where modifying comprises including at least one call and a software library in the application program, where the at least one call is to a method that comprises part of the software library;
   upon receiving a request from the augmented application program via a device where the augmented application program has been installed and is resident, registering the device against a user of the device and authenticating the augmented application program based at least in part upon information received with the request; and
   in response to successfully registering the device and authenticating the augmented application program, sending a policy file to the augmented application program via the device, the policy file being configured to control use of only the authenticated augmented application program when executed on the registered device;
   where the application program is augmented to modify an entry point of the application program to inject code to cause a call to the software library that displays, on the device, user interface components configured to gather information regarding the user and to securely send from the device the user's information and information descriptive of the device, and where
   the application program is further augmented to at least periodically confirm that the authenticated augmented application program is authorized to continue to be executed on the registered device;
   where the policy file is an original policy file, further comprising sending a modified policy file to the augmented application program to take the place of the original policy file; and
   where the modified policy file is sent to the augmented application program by pushing the modified policy file or in response to a polling request received from the augmented application program, where the polling request is received from the augmented application program in response to the call made to the method that comprises part of the software library.

2. The method of claim 1, where the request is received in response to the call made to the method that comprises part of the software library.

3. The method of 1, where modifying is accomplished by at least one of an enterprise on an as received application program or is accomplished by an application program developer as part of an application program development process, and where modifying further comprises publishing the augmented application program to a repository of augmented application programs from where a user of the device can download the augmented application programs.

4. The method of claim 1, where the at least one data processor is associated with an enterprise, where the application program is one that is created by or for the enterprise, where a user of the device is an employee of the enterprise and where the device is the employee's own device.

5. The method of claim 1, where at least the original policy file specifies at least one of a temporal constraint and a spatial constraint on the use of the augmented application program at the device.

6. A system, comprised of at least one data processor connected with at least one memory that stores software instructions, where execution of the software instructions by the at least one data processor causes the system to:
   modify an application program to create an augmented application program, where modifying comprises including at least one call and a software library in the application program, where the at least one call is to a method that comprises part of the software library;
   in response to a receipt of a request from the augmented application program via a device where the augmented application program has been installed and is resident, to register the device against a user of the device and authenticate the augmented application program based at least in part upon information received with the request; and
   in response to a successful registering of the device and authentication of the augmented application program, to send a policy file to the augmented application program via the device, the policy file being configured to control use of only the authenticated augmented application program when executed on the registered device;
   where the application program is augmented to modify an entry point of the application program to inject code to cause a call to the software library that displays, on the device, user interface components configured to gather information regarding the user and to securely send from the device the user's information and information descriptive of the device, and where
   the application program is further augmented to at least periodically confirm that the authenticated augmented application program is authorized to continue to be executed on the registered device;
   where the policy file is an original policy file, and where the system is further configured to send a modified policy file to the augmented application program to take the place of the original policy file; and
   where the modified policy file is sent to the augmented application program by pushing the modified policy file or in response to a polling request received from the augmented application program, where the polling request is received from the augmented application program in response to the call made to the method that comprises part of the software library.

7. The system of claim 6, where the request is received in response to the call made to the method that comprises part of the software library.

8. The system of claim 6, where the at least one data processor is associated with an enterprise and where modifying is accomplished by at least one of the enterprise on an as received application program or is accomplished by an application program developer as part of an application program development process, and where modifying further comprises publishing the augmented application program to a repository of augmented application programs from where a user of the device can download the augmented application programs.

9. The system of claim 6, where the system is associated with an enterprise, where the application program is one that is created by or for the enterprise, where a user of the device is an employee of the enterprise and where the device is the employee's own device.

10. The system of claim 6, where at least the original policy file specifies at least one of a temporal constraint and a spatial constraint on the use of the augmented application program at the device.

11. A computer program product comprised of software instructions on a non-transitory computer-readable medium, where execution of the software instructions using a computer results in performing operations comprising:
    modifying an application program to create an augmented application program, where modifying comprises including at least one call and a software library in the application program, where the at least one call is to a method that comprises part of the software library;
    upon receiving a request from the augmented application program via a device where the augmented application program has been installed and is resident, registering the device against a user of the device and authenticating the augmented application program based at least in part upon information received with the request; and
    in response to successfully registering the device and authenticating the augmented application program, sending a policy file to the augmented application program via the device, the policy file being configured to control use of only the authenticated augmented application program when executed on the registered device;
    where the application program is augmented to modify an entry point of the application program to inject code to cause a call to the software library that displays, on the device, user interface components configured to gather information regarding the user and to securely send from the device the user's information and information descriptive of the device, and where
    the application program is further augmented to at least periodically confirm that the authenticated augmented application program is authorized to continue to be executed on the registered device;
    where the policy file is an original policy file, further comprising an operation of sending a modified policy file to the augmented application program to take the place of the original policy file; and
    where the modified policy file is sent to the augmented application program by pushing the modified policy file or in response to a polling request received from the augmented application program, where the polling request is received from the augmented application program in response to the call made to the method that comprises part of the software library.

12. The computer program product of claim 11, where the request is received in response to the call made to the method that comprises part of the software library.

13. The computer program product of claim 11, where the operation of modifying is accomplished by at least one of the enterprise on an as received application program or is accomplished by an application program developer as part of an application program development process, and where the operation of modifying further comprises an operation of publishing the augmented application program to a repository of augmented application programs from where a user of the device can download the augmented application programs.

14. The computer program product of claim 11, where the computer program product is associated with an enterprise, where the application program is one that is created by or for the enterprise, where a user of the device is an employee of the enterprise and where the device is the employee's own device.

15. The computer program product of claim 11, where at least the original policy file specifies at least one of a temporal constraint and a spatial constraint on the use of the augmented application program at the device.

16. A method comprising:
    receiving an application program at a device, the application program being an augmented application program that has been augmented to include at least one call and a software library, where the at least one call is to a method that comprises part of the software library and where the augmented application program is received from a repository of augmented application programs;
    installing the received augmented application program on the device;
    launching the augmented application program and sending a request to a server of an enterprise, the request being one to register the device against a user of the device and authenticate the augmented application program, the request being sent with information descriptive of at least the device and the user of the device;
    in response to the server successfully registering the device against the user and authenticating the augmented application program, receiving a policy file from the server, the policy file being configured to control use of only the authenticated augmented application program when executed on the registered device; and
    running the augmented application program in the device in cooperation with calls made to the software library and in cooperation with the policy file;
    where the application program is augmented to modify an entry point of the application program to inject code to cause a call to the software library that displays, on the device, user interface components configured to gather information regarding the user and to securely send from the device the user's information and information descriptive of the device, and where
    the application program is further augmented to at least periodically confirm with the server of the enterprise that the authenticated augmented application program is authorized to continue to be executed on the registered device;

where the policy file is an original policy file, and further comprising receiving a modified policy file at the device to take the place of the original policy file, and where the modified policy file is received at the augmented application program at the device by being pushed to the device or in response to a polling request made by the device in response to a call made to a method that comprises part of the software library.

17. The method of claim 16, where the augmented application program is comprised of an application program that was created by or for the enterprise, where the user of the device is an employee of the enterprise and where the device is the employee's own device.

18. The method of claim 16, where the at least the original policy file specifies at least one of a temporal constraint and a spatial constraint on the use of the augmented application program at the device.

\* \* \* \* \*